(12) United States Patent
Beaudoin et al.

(10) Patent No.: US 8,404,875 B2
(45) Date of Patent: Mar. 26, 2013

(54) METHOD FOR PREVENTING THE OXIDATION OF LIPIDS IN ANIMAL AND VEGETABLE OILS AND COMPOSITIONS PRODUCED BY THE METHOD THEREOF

(76) Inventors: Adrien Beaudoin, Rock Forest (CA); Richard Boudreault, North Hatley (CA)

( * ) Notice: Subject to any disclaimer, the term of this patent is extended or adjusted under 35 U.S.C. 154(b) by 0 days.

(21) Appl. No.: 12/653,002

(22) Filed: Dec. 7, 2009

(65) Prior Publication Data
US 2010/0239715 A1 Sep. 23, 2010

Related U.S. Application Data

(63) Continuation-in-part of application No. 11/053,294, filed on Feb. 7, 2005, now abandoned.

(51) Int. Cl.
*C07C 5/00* (2006.01)
*C07C 51/43* (2006.01)
*C07C 51/50* (2006.01)

(52) U.S. Cl. .............. 554/175; 554/2; 554/5; 554/100; 554/212

(58) Field of Classification Search .................. 554/2, 5, 554/100, 175, 212
See application file for complete search history.

(56) References Cited

FOREIGN PATENT DOCUMENTS

| CA | 1294629 | 1/1992 |
|----|---------|--------|
| CA | 1339472 | 9/1997 |
| CA | 2251265 | 4/2000 |
| CA | 2473660 | 7/2003 |
| JP | 2203741 | 8/1990 |
| JP | 09110888 | 4/1997 |
| JP | 2001-323295 | 11/2001 |
| WO | 93/10207 A1 | 5/1993 |

OTHER PUBLICATIONS

Kolakowska et al., Journal of Food Science, vol. 59, No. 1, 10994, pp. 88-90.*
Chem. Abstr. of JP-09110888.*
Chem Abstr. of Nasner, Lipid Oxid.: Biol. Food Chem. Aspects, "Antioxidizing properties of Lecithin,", 1986.*
Office Action dated Feb. 27, 2007 from parent U.S. Appl. No. 11/053,294.
Office Action dated Oct. 9, 2008 from parent U.S. Appl. No. 11/053,294.
Office Action dated Jul. 7, 2009 from parent U.S. Appl. No. 11/053,294.
Office Action dated Nov. 7, 2011 from copending CA case No. 2,555,281.
IPRP dated Jun. 8, 2006 from PCT case No. PCT/CA2005/000150.
Written opinion and Search report dated Jun. 8, 2006 from PCT case No. PCT/CA2005/000150.
Dunlap et al.; Notothenioid fish, krill and phytoplankton from Antarctica contain a vitamin E constituent (x-tocomonoenol) functionally associated with cold-water adaptation; Comparative Biochemistry and Physiology Part B 2002; 133; pp. 299-305.
Kobayashi; In vivo antioxidant role of astaxanthin under oxidative stress in the green alga *Haematococcus pluvialis*; Appl Microbiol Biotechnol; 2000; vol. 54; pp. 550-555.
Kolakowska et al.; Stabilization of lipids in minced fish by freeze texturization; Journal of food science; 1994; vol. 59, No. 1; pp. 88-90.
Nasner; Antioxidizing properties of lecithin; Lipid Oxid.: Biol. Food Chem. Aspects, Contrib. Lipidforum/Sik Symp.; 1986; Conference—Abstract.
Takaichi et al.; Fatty acids of astaxanthin esters in krill determined by mild mass spectrometry; Comparative Biochemistry and Physiology Part B; 2003; 136; pp. 317-322.
Vicetti et al.; Use of alpha-tocopherol combined with synergists and compared to other antioxydents on the oxidative stability of sardine skin lipids; Journal of Food Composition and Analysis; 2005; 18; pp. 131-137. Note: Date of journal 2005, however issue dispatch date Dec. 8, 2004, available online Aug. 11, 2004.
Vicetti et al.; Use of alpha-tocopherol combined with synergists and compared to other antioxydents on the oxidative stability of sardine skin lipids; Journal of Food Composition and Analysis; 2005; 18; pp. 131-137.

* cited by examiner

*Primary Examiner* — Deborah D Carr
(74) *Attorney, Agent, or Firm* — Goudreau Gage Dubuc; Julie Gauvreau

(57) ABSTRACT

A composition comprising an oil selected from the group consisting of vegetable oils, animal oils, and krill oil in an amount sufficient to lower the peroxide index of the composition. The composition may preferably comprise a fish oil also having astaxanthin added thereto.

20 Claims, No Drawings

METHOD FOR PREVENTING THE OXIDATION OF LIPIDS IN ANIMAL AND VEGETABLE OILS AND COMPOSITIONS PRODUCED BY THE METHOD THEREOF

This application is a Continuation-In-Part of application Ser. No. 11/053,294 filed Feb. 7, 2005 now abandoned, the teachings of which are hereby incorporated by reference.

FIELD OF THE INVENTION

The present invention relates to a method for preventing the oxidation of lipids in animal and vegetable oils caused by free radicals and other oxygen reactive species and two compositions containing animal and vegetable oils.

BACKGROUND OF THE INVENTION

Free unsaturated fatty acids as well as acylated unsaturated fatty acids present in the main lipid classes are susceptible to oxidation. Although less often mentioned, sterols and carotenoids as well as their esters should be added to this list of lipids prone to oxidation. Unsaturated fatty acids can be regrouped in three main families according to the position of the double bonds in their hydrocarbon chain: Omega-3, 6 and 9 families. Lipid peroxydation is caused by "Reactive Oxygen Species". This includes the non-radicals: hydrogen peroxide and singlet oxygen, and the radicals: superoxide, hydroxyl, lipid peroxyl and lipid alkoxyl. In the human body the most important species involved in fatty acid oxidation are the highly reactive hydroxyl radical and singlet oxygen.

Since the reaction $RH+O_2$ generation of free radicals, is thermodynamically difficult (activation energy of about 35 kcal/ml), the production of the first few radicals necessary to start the propagation reaction normally must occur by some catalytic means such as hydroperoxide decomposition, light and heat exposure and metal catalysis.

Three different mechanisms are able to induce lipid oxidations of which a first is autoxidation by free radical reaction where the oxidation process is initiated by hydroxyl radicals.

A second mechanism is photo-oxidation. As singlet oxygen ($^1O_2$) is highly electrophilic, it can react rapidly with unsaturated lipids but by a different mechanism than free radical autoxidation. In the presence of sensitizers (chlorophyll, porphyrins, myoglobin, riboflavin, bilirubin, erythrosine, rose bengal, methylene blue and many other drugs and dyes), a double bond interacts with singlet oxygen produced from $O_2$ by light. Oxygen is added at either end of a carbon double bond which takes the trans configuration. Thus, one possible reaction of singlet $O_2$ with a double bond between C12 and C13 of one fatty acid is to produce 12- and 13-hydroperoxides. The lifetime of singlet $O_2$ in the hydrophobic cell membrane is greater than in aqueous solution. Furthermore, photo-oxidation is a quicker reaction than autoxidation since it was demonstrated that photo-oxidation of oleic acid can be 30,000 times quicker than autoxidation and for polyenes photo-oxidation can be 1,000-15,000 times quicker. Similar effects have been described in liposomes and in intact membranes. Thus a combination of photosensitizers with polyunsaturated lipids, as often it is the case in food supplements or nutraceuticals provide conditions extremely favourable to photo-oxidation. That is why all the oils in food products should be protected from light.

Oxygen in the singlet state can apparently interpose between a labile hydrogen to form a hydroperoxide directly $—RH+O_2=ROOH$.

The chains of reactions can be terminated in several ways:
I. Two lipid radicals combine to form a dimer and eventually polymeric products;
II. Peroxyl radicals can undergo cyclization followed by decomposition of the cyclic compounds, oxyacids, and hydrocarbons;
III. Presence of chain-breaking antioxidants, which are themselves capable of forming radicals, unite with lipid radicals.

Photosensitized oxidation is efficiently inhibited by carotenoids and the main protective role played by these compounds takes place in green plants. The inhibitory mechanism is thought to be through an interference with the formation of singlet oxygen from the oxygen molecule. In contrast, tocopherols inhibit this oxidation by quenching the previously formed singlet oxygen, forming stable addition products. When such oxidation processes occur in food lipids, the result is rancidity and deterioration in product quality. Nutritive value is then reduced as a result of the removal of essential fatty acids and antioxidant nutrients. Some oxidation products are toxic as well. The overall nutritional significance of the oxidation on the losses of essential fatty acids that ensue, are normally relatively small in relation to the total dietary polyunsaturated fatty acids. More serious is the loss of the antioxidant nutrients, Vitamin E, various carotenes and Vitamin C that will not play their protective role once they get into the body.

The possibility that dietary cholesterol is also oxidized must be seriously considered, especially if the level of protective antioxidants is reduced in the diet as a result of the oxidation of polyunsaturated fatty acids. The reduction of dietary antioxidants itself may have some serious consequences in the body defences against reactive oxygen species of free radicals.

SUMMARY OF THE INVENTION

It is an object of the present invention to provide a composition wherein the oxidation of an animal or vegetable oil is lessened.

It is a further objection of the present invention to provide a method for lowering the oxidation of a vegetable or animal oil.

According to one aspect of the present invention, there is provided a method for preventing lipid oxidation in an oil selected from the group consisting of animal and vegetable oils, comprising the step of adding to the oil a member to reduce the level of lipid peroxides and free radicals, the member being selected from the group consisting of krill oil, a krill extract, and phospholipids.

In a further aspect of the present invention, there is provided a method of reducing the oxidation of an oil selected from the group consisting of vegetable oils and animal oils, comprising the step of adding krill oil in an amount sufficient to lower the peroxide value of the mixture.

In a further aspect of the present invention, there is provided a method of reducing the oxidation of an oil selected from the group consisting of vegetable and animal oils by adding phospholipids alone or in combination with astaxanthin.

Lipid radicals or peroxides could be toxic if they were absorbed. While some animal studies have suggested that this would not be the case, other studies have demonstrated that feeding lipid peroxides results in increases of liver weight, along with increases in malonaldehyde, peroxide and carbonyl concentrations in tissues, with decreases in an alpha-tocopherol and linoleic acid concentrations. If lipid hydroperoxides are not absorbed, then these damages could be attributed to the products of their decomposition.

Krill oil is described in Canadian Patent 2,251,265 and this patent teaches a process for the extraction of lipids from krill. This oil is different from fish oils and contains a significant proportion of phospholipids as compared to triglycerides which are the main component of fish oils.

Preferably, the krill oil is present in an amount of between 1% and 40% on a weight/volume ratio and even more preferably, is present in an amount of between 2% and 25%.

Astaxanthin is a red pigment which occurs naturally in a wide variety of living organisms and is a carotenoid belonging to the xanthophylls class. It has a molecular weight lower than 600 Da and is mostly liposoluble although its side rings have some polar substitute groups. Many crustaceans including shrimp, crawfish, crabs and lobster are tinted red by accumulated astaxanthin. Unicellular microscopic seaweeds are the primary producers of this red pigment The colour of some fish such as salmon is due to this pigment. The salmon takes the astaxanthin through its diet particularly from the krill. The krill itself does not produce astaxanthin, but stores it from the seaweed *haematococcus pluvialis*.

In a preferred embodiment, the composition of the present invention as well as the method will provide for including astaxanthin in the composition. Preferably, the astaxanthin is provided in an amount of between 0.5% and 5% by weight/volume and more preferably between 1% and 3%.

In a still further preferred embodiment of the present invention, the composition will also comprise Vitamin E, the Vitamin E being added in an amount of between 0.1% and 2% by weight/volume. Conveniently, the Vitamin E may be present as an alpha-tocopherol although other forms can be utilized.

The oil composition may also include a phospholipid preferably in conjunction with a carotenoid. The phospholipids can be obtained either from an animal source or a vegetable source with a preferred source being soybean lecithins. The phospholipids are comprised of polyunsaturated fatty acid residues. Preferably, the soybean lecithins are present in an amount of between 1% and 10% by weight/volume.

When utilizing krill extract, it may be obtained by incubating a selected vegetable oil ground krill followed by a cold press extraction.

As will be seen in the Examples, various vegetable oils may be utilized including olive oil, grape seed oil, canola oil, etc.

The invention could be used to preserve lipids from oxidation in nutraceutical, cosmeceutical, pharmalogical and functional food compositions. A preferred use of the composition of the present invention is for the manufacture of fish oil supplements either in bulk or encapsulated. These supplements, which have become very common, are known for their essential fatty acids and particularly, the Omega 3 fatty acids.

The following Examples illustrate embodiments of the present invention.

EXAMPLE 1

One litre of several different oils was mixed with 25 ml of krill oil and allowed to stand at either 20° C. or 40° C. for different lengths of time. The peroxide value was then estimated according to AOAC official method 965.33. Determinations were made in duplicate.

Materials

The various oils tested were grape seed oil, origin from France, trademark "Soleil D'Or", distributed by Maison Orphée; canola oil commercially available; olive oil, packed in Canada, origin Argentina; fish oil, origin Canada and provided by Ocean Nutrition; Krill oil was extracted according to the method described in Patent No. CA 2251265 PCT # WO 00/23546; seal oil, from Canada.

TABLE I

Animal and Plant Oil Levels of Oxidation at 20° C.

|  | 4 DAYS | REFERENCE | 38 DAYS | REFERENCE | 69 DAYS | REFERENCE |
|---|---|---|---|---|---|---|
| Krill oil | 1.4 | — | 0.00 | — | 0.00 | — |
| Grape seed oil | 3.5 | 1.00 | 6.3 | 1.00 | 19.9 | 1.00 |
| Grape seed and krill oil | 2.9 | 0.83 | 3.0 | 0.48 | 7.2 | 0.36 |
| Olive oil | 14.8 | 1.00 | 15.8 | 1.00 | 17.7 | 1.00 |
| Olive oil and krill oil | 11.9 | 0.80 | 11.9 | 0.75 | 14.0 | 0.79 |
| Canola oil | 4.8 | 1.00 | 9.1 | 1.00 | 19.7 | 1.00 |
| Canola and krill oil | 4.6 | 0.96 | 4.5 | 0.49 | 7.6 | 0.39 |

Reference—Oil Equals 1

TABLE II

Animal and Plant Oil Levels of Oxidation at 20° C.

|  | 4 DAYS | REFERENCE | 38 DAYS | REFERENCE | 69 DAYS | REFERENCE |
|---|---|---|---|---|---|---|
| Krill oil | 1.4 | — | 0.00 | — | 0.00 | — |
| Seal oil | 7.0 | 1.00 | 23.7 | 1.00 | 30.9 | 1.00 |
| Seal and krill oil | 5.3 | 0.76 | 6.0 | 0.25 | 9.6 | 0.31 |
| Fish oil | 7.7 | 1.00 | 31.2 | 1.00 | 39.7 | 1.00 |
| Fish and krill oil | 6.6 | 0.86 | 19.8 | 0.63 | 22.9 | 0.58 |

TABLE III

Animal and Plant Oil Levels of Oxidation at 40° C.

|  | 4 DAYS | REFERENCE | 38 DAYS | REFERENCE | 69 DAYS | REFERENCE |
|---|---|---|---|---|---|---|
| Krill Oil | 1.4 | — | 0.00 | — | 0.00 | — |
| Grape seed oil | 3.5 | 1.00 | 9.1 | 1.00 | 22.4 | 1.00 |
| Grape seed and krill oil | 2.9 | 0.83 | 3.0 | 1.00 | 8.9 | 0.40 |

TABLE III-continued

Animal and Plant Oil Levels of Oxidation at 40° C.

|  | 4 DAYS | REFERENCE | 38 DAYS | REFERENCE | 69 DAYS | REFERENCE |
|---|---|---|---|---|---|---|
| Olive oil | 14.8 | 1.00 | 19.0 | 1.00 | 21.5 | 1.00 |
| Olive oil and krill oil | 11.9 | 0.80 | 12.0 | 0.63 | 19.0 | 0.88 |
| Canola oil | 4.8 | 1.00 | 8.9 | 1.00 | 23.0 | 1.00 |
| Canola and krill oil | 4.6 | 0.96 | 4.8 | 0.54 | 7.7 | 0.33 |

TABLE IV

Animal and Plant Oil Levels of Oxidation 40° C.

|  | 4 DAYS | REFERENCE | 38 DAYS | REFERENCE | 69 DAYS | REFERENCE |
|---|---|---|---|---|---|---|
| Krill Oil | 1.4 | — | 0.00 | — | 0.00 | — |
| Seal oil | 7.0 | 1.00 | 30.0 | 1.00 | 32.0 | 1.00 |
| Seal and krill oil | 5.3 | 0.76 | 6.2 | 0.21 | 10.0 | 0.31 |
| Fish oil | 7.7 | 1.00 | 77.2 | 1.00 | 138.5 | 1.00 |
| Fish and krill oil | 6.6 | 0.86 | 20.6 | 0.27 | 26.8 | 0.19 |

Results

Table I shows the peroxide values (PV) measured at 4 days at 38 days and 69 days. One can notice in most cases at day four (with two exceptions) the PV is below 10. In all cases the addition of krill oil significantly decreases the PV of the corresponding animal or plant oil. At 38 days the same observation can be made, but the differences between the plant oil alone and its combination with krill oil becomes more evident. As shown in Table II, in the case of fish and seal oil which are enriched in polyunsaturated fatty acids not protected by antioxidants, addition of krill oil reduces the PV by about 25% and 15% respectively at 4 days after the blend.

At 38 and 69 days the PV of both fish oil and seal oil more than triples whereas very good protection by krill oil can be observed (5.3 vs 6.0) for seal oil. At 69 days the efficiency of krill oil persists; as may be seen the PV is 9.6 as compared to 30.9 for non-protected seal oil.

At 40° C. the same trend is observed. It will also be noticed that krill oil is stable in all these conditions and that only a small amount is needed to provide substantial protection.

As shown in Tables III-IV the same general trend can be observed for the protective effect of krill on both animal and plant oils. In all cases a significant decrease is observed with the use of krill oil. The fish oil appears to be particularly altered and in the latter case krill oil reduced the PV by about 80%; seal oil PV appears to reach a plateau at a PV of 30. In the latter case the small percentage of krill oil reduces its PV by about 70%.

It is noteworthy that the commercial oils are highly prone to oxidation as indicated in Tables I and III. One could expect that under the usual conditions of the household these oils would undergo extensive oxidation and that krill oil can provide a solution to reduce this oxidation process.

EXAMPLE 2

Various oils were-mixed with either krill oil or a combination of krill oil and astaxanthin at different ratios and allowed to stand either at 20° C., 40° C. for different varying periods of time. The peroxide value was estimated according to a method previously set forth.

The materials used were grape seed oil, origin of France distributed by Maison Orphée, Québec (Canada); fish oil, provided by Ocean Nutrition, Halifax, Nova Scotia (Canada); krill oil was extracted according to the method described in Patent No. CA 2251265 PCT # WO 00/23546.

TABLE V

Animal Oil Levels of Oxidation at 20° C.

|  | 4 DAYS | REFERENCE | 30 DAYS | REFERENCE | 60 DAYS | REFERENCE |
|---|---|---|---|---|---|---|
| Reference Oil equals 1 - Fish oil | 12.0 | 1 | 28 | 1 | 42.8 | 1 |
| Krill Oil | 0.00 | — | 0.00 | — | 2.8 | — |
| Fish oil, krill oil* Astaxanthin | 4.4 | 0.34 | 8.0 | 0.29 | 12.3 | 0.29 |
| Fish oil, krill oil* | 5.7 | 0.44 | 14.5 | 0.52 | 18.1 | 0.42 |
| Fish oil, krill oil** Astaxanthin | 5.7 | 0.44 | 12.0 | 0.43 | 13.7 | 0.32 |
| Fish oil, krill oil** | 3.2 | 0.25 | 20.1 | 0.72 | 20.2 | 0.47 |
| Fish oil, krill oil*** Astaxanthin | 2.3 | 0.18 | 10.0 | 0.36 | 22.2 | 0.52 |
| Fish oil, krill oil*** | 1.4 | 0.11 | 14.0 | 0.50 | 23.1 | 0.54 |

Reference Oil equals 1
W.V. = Weight Value
Krill oil* = 25% W.V
Krill oil** = 10% W.V.
Krill oil*** = 2.5% W.V.
Astaxanthin = 2%.

TABLE VI

Animal Oil Level of Oxidation at 40° C.

|  | 4 DAYS | REFERENCE | 30 DAYS | REFERENCE | 60 DAYS | REFERENCE |
|---|---|---|---|---|---|---|
| Reference oil - Fish oil | 12.9 | 1 | 30.1 | 1 | 101.5 | 1 |
| Krill Oil | 0.00 | — | 0.00 | — | 5.2 | 0.05 |
| Fish oil, krill oil* Astaxanthin | 4.4 | 0.34 | 12.0 | 0.40 | 20.8 | 0.20 |
| Fish oil, krill oil* | 5.7 | 0.44 | 20.6 | 0.68 | 24.6 | 0.24 |
| Fish oil, krill oil** Astaxanthin | 5.7 | 0.44 | 14.0 | 0.47 | 28.5 | 0.28 |
| Fish oil, krill oil** | 3.2 | 0.25 | 22.0 | 0.73 | 38.7 | 0.38 |
| Fish oil, krill oil*** Astaxanthin | 2.3 | 0.18 | 28.0 | 0.93 | 57.7 | 0.57 |
| Fish oil, krill oil*** | 1.4 | 0.11 | 34.0 | 1.13 | 60.8 | 0.60 |

Reference Oil equals 1
W.V. = Weight Value
Krill oil* = 25% W.V.
Krill oil** = 10% W.V.
Krill oil*** = 2.5% W.V.
Astaxanthin = 2%.

TABLE VII

Animal and Plant Oil Level of Oxidation at 20° C.

| Reference oil - Grape seed oil | 4 DAYS | REFERENCE | 30 DAYS | REFERENCE |
|---|---|---|---|---|
|  | 18.0 | REFERENCE | 44.1 | 1 |
| Krill Oil | 0.00 | — | 0.00 | — |
| Grape seed oil, krill oil*** | 7.9 | 0.44 | 27.0 | 0.61 |
| Grape seed oil, krill oil*** | 7.3 | 0.41 | 26.9 | 0.61 |
| Grape seed oil, krill oil*** Astaxanthin | 6.8 | 0.38 | 23.0 | 0.52 |
| Grape seed oil, krill oil*** Astaxanthin | 1.9 | 0.11 | 21.5 | 0.49 |

Reference Oil equals 1
W.V. = Weight Value
Krill oil* = 25% W.V
Krill oil** = 10% W.V.
Krill oil*** = 2.5% W.V.
Astaxanthin = 2%.

Results

Tables V-VI show the peroxide values (PV) measured at day 4 after the blend and 30 and 60 days later. In all cases at day 4, with two exceptions, fish and grape seed oils without protection, the PV is below 10 and addition of krill oil decreases significantly the PV of the corresponding animal or plant oils.

It is noteworthy that the PV of krill oil at 30 days, at 20° C. and even at 40° C. remain at zero. In contrast unprotected fish oil shows a PV of about 30 and goes to 40° at 20, 100 at 40° C. respectively at 60 days addition of krill oil reduces PV in all conditions. Combination of astaxanthin appears to further reduce the PV especially at 60 days. Hence the addition of astaxanthin to the blend of fish oil and krill oil reinforces the protection against oxidation as measured by the PV.

Similar protection by krill oil was observed with plant oils.

Table VII shows the influence of krill oil and astaxanthin on plant oil stability. Determinations were started 4 days after the blend was made. Krill oil and astaxanthin have significantly reduced the peroxide level in grape seed oil especially in the case of 5% krill oil and 2% astaxanthin.

After 30 days at 20° C. it is reduced by about 50% in the latter mix.

EXAMPLE 3

A blend of fatty acid ethyl esters enriched in Eicosapentaenoic (EPA), Docosapentaenoic (DPA) and Docosahecaenoic (DHA) derived from fish oil was prepared with an oleoresin "Zanthin" containing 10% astaxanthin, 2.5% krill oil and 5%, (W/V) Vitamin E. After mixing and encapsulation in softgel capsules, the level of lipid peroxides was determined on the product. Analysis of the softgel capsules after 6 months on the shelves (at room temperature) show an acceptable level of PV of 5.0.

EXAMPLES 4-7

In these examples, and with the results set forth in tables VIII through XI, various combinations using soybean lecithins are set forth. The reduction in oxidation is believed to be due to the phospholipids.

Third Series of experiments Peroxide Value (PV)
Table VIII—at 20° C. and 40° C.
Peroxide value of different blends of grape seed oil with soy lecithin and astaxanthin

TABLE VIII

|  |  |  | 20° C. | | | | 40° C. | |
|---|---|---|---|---|---|---|---|---|
|  | Initial | Reference | 15 days | Reference | 30 days | Reference | 15 days | Reference |
| 1. Reference oil - Grape seed oil | 5 | 1 | 6 | 1 | 8.7 | 1 | 12.6 | 1 |
| 1A Grape seed oil Soy lecithin | 5 | 1.00 | 5.1 | 0.85 | 8.3 | 0.95 | 5.9 | 0.47 |
| 1B Grape seed oil Astaxanthin | 4.8 | 0.96 | 4.8 | 0.80 | 4.8 | 0.55 | 5.9 | 0.47 |

TABLE VIII-continued

|  | Initial | Reference | 20° C. | | | | 40° C. | |
|---|---|---|---|---|---|---|---|---|
|  |  |  | 15 days | Reference | 30 days | Reference | 15 days | Reference |
| 1C Grape seed oil Soy lecithin Astaxanthin | 4 | 0.80 | 4.9 | 0.82 | 5.8 | 0.67 | 7.1 | 0.56 |

As shown in Table VIII, several antioxidants and combinations were tested for their protective effects on grape seed oil. This includes soy lecithin, astaxanthin, and combinations. A decease of PV can be observed after 15 days and, at 30 days at room temperature when soy lecithin is added to that oil. Astaxanthin also exerts a positive effect. Comparable results are obtained at 40° C. for 15 days.

Third Series of experiments Peroxide Value (PV)
Table IX—at 20° C.
Peroxide value of grape seed oil, krill extract (1:0.25) (w/w) with soy lecithin and astaxanthin

TABLE IX

|  | Initial | Reference | 15 days | Reference | 30 days | Reference |
|---|---|---|---|---|---|---|
| 1. Reference oil - Grape seed oil with krill oil extracted (1:0.25) | 6 | 1 | 6.3 | 1 | 13.2 | 1 |
| 7A Grape seed oil Krill extract (1:0.25) Soy lecithin | 3.5 | 0.58 | 5.1 | 0.81 | 6 | 0.45 |
| 7B Grape seed oil Krill extract (1:0.25) Astaxanthin | 5 | 0.83 | 5.9 | 0.94 | 6 | 0.45 |
| 7C Grape seed oil Krill extract (1:0.25) Soy lecithin Astaxanthin | 3.5 | 0.58 | 4.3 | 0.68 | 4.9 | 0.37 |

Grape seed oil was used to extract frozen krill in a ratio of 1:0.25 (w/w). After cold pressure extraction, the influences of soy lecithin and astaxanthin were tested on the extract maintained at 20° C. Results are shown in Table IX, where soy lecithin greatly improved the oil stability as judged by the PV. Astaxanthin was as efficient and when combined with soy lecithin further decreased the PV. Comparable results were obtained when the extract was prepared with the ratio of grape seed oil to krill of 1;1 (w/w)

Third Series of experiments Peroxide Value (PV)
Table X—at 20° C. and 40° C.
Peroxide value of different blends of olive oil with soy lecithin and astaxanthin

TABLE X

|  | Initial | Reference | 20° C. | | | | 40° C. | |
|---|---|---|---|---|---|---|---|---|
|  |  |  | 15 days | Reference | 30 days | Reference | 15 days | Reference |
| 1. Reference oil - Olive oil | 7 | 1 | 7.7 | 1 | 10.6 | 1 | 11.1 | 1 |
| 2A Olive oil Soy lecithin | 5.2 | 0.74 | 6.7 | 0.87 | 8.6 | 0.81 | 9 | 0.81 |
| 2B Olive oil Astaxanthin | 5 | 0.71 | 5.2 | 0.68 | 6.2 | 0.58 | 5.9 | 0.53 |
| 2C Olive oil Soy lecithin Astaxanthin | 5 | 0.71 | 5.8 | 0.75 | 5.8 | 0.55 | 5.3 | 0.48 |

Table X shows the results obtained with olive oil in the same conditions as those used for grape seed oil. Once again with olive oil, the addition of soy lecithin or astaxanthin results in a significant decrease in PV.

Third Series of experiments Peroxide Value (PV)
Table XI—at 40° C.
Peroxide value of different blends of animal oil with krill oil extracted (1:0.25), soy lecithin and astaxanthin

TABLE XI

| 1. Reference oil - Fish oil with krill extracted (1:0.25) | 40° C. | | | |
|---|---|---|---|---|
| | Initial 11 | Reference 1 | 15 days 60 | Reference 1 |
| 9A Fish &krill oil Soy lecithin | 2 | 0.18 | 39.6 | 0.66 |
| 9B Fish & krill oil Astaxanthin | 3 | 0.27 | 54.8 | 0.91 |
| 9C Fish & krill oil Soy lecithin Astaxanthin | 3.5 | 0.32 | 24.8 | 0.41 |

Fish oil concentrate is highly prone to oxidation. Extraction of frozen krill with fish oil concentrate followed by cold extraction did result in an extract with a rapidly rising level of peroxides. The addition of soy lecithin or astaxanthin caused a marked reduction in PV as compared to the extract alone. In the latter combination astaxanthin and soy lecithin results after 15 days at 40° C. resulted in a 50% decrease of PV.

We claim:

1. A method of reducing the peroxidation of an extracted animal oil and/or vegetable oil comprising adding extracted krill oil in an amount sufficient to reduce the peroxidation of said extracted animal oil and/or vegetable oil.

2. The method of claim 1, wherein said extracted krill oil is added in an amount of between 2% and 25% on a weight/volume ratio.

3. The method of claim 1, wherein said animal oil is a marine oil.

4. The method of claim 2, further comprising adding a phospholipid to said animal oil and/or vegetable oil.

5. The method of claim 4, wherein said phospholipid is added in an amount of between 1% and 10% by weight/volume.

6. The method of claim 5, wherein said phospholipid is soy lecithin.

7. The method of claim 4, further comprising adding a carotenoid to said animal oil and/or vegetable oil.

8. The method of claim 7, wherein said carotenoid is astaxanthin and added in an amount of between 1% and 3% by weight/volume.

9. The method of claim 7, further comprising adding vitamin E to said animal oil and/or vegetable oil.

10. The method of claim 9, wherein said vitamin E is added in an amount of between 0.1% and 2% by weight/volume.

11. A composition comprising (i) an extracted animal oil and/or vegetable oil and (ii) extracted krill oil, said krill oil being present in an amount sufficient to reduce peroxidation of the animal and/or vegetable oil.

12. The composition of claim 11, wherein said extracted krill oil is present in an amount of between 2 and 25% on a weight/volume ratio.

13. The composition of claim 12, wherein said animal oil is a marine oil.

14. The composition of claim 13, further comprising a phospholipid.

15. The composition of claim 14, wherein said phospholipid is present in an amount of between 1% and 10% by weight/volume.

16. The composition of claim 15, wherein said phospholipid is soy lecithin.

17. The composition of claim 14, further comprising astaxanthin.

18. The composition of claim 17, wherein said astaxanthin is present in an amount of between 1 and 3% by weight/volume.

19. The composition of claim 17, further comprising Vitamin E.

20. The composition of claim 19, wherein said Vitamin E is present in an amount of between 0.1 and 2% by weight/volume.

* * * * *